United States Patent
Egan et al.

(10) Patent No.: US 7,547,385 B2
(45) Date of Patent: Jun. 16, 2009

(54) METHOD AND SYSTEM FOR PRODUCING A SUPERCRITICAL CRYOGENIC FUEL (SCCF)

(75) Inventors: Gregory J. Egan, Littleton, CO (US); Robert Rudland, Broomfield, CO (US)

(73) Assignee: Eden Innovations Ltd., Dublin (IE)

( * ) Notice: Subject to any disclaimer, the term of this patent is extended or adjusted under 35 U.S.C. 154(b) by 799 days.

(21) Appl. No.: 11/273,397

(22) Filed: Nov. 14, 2005

(65) Prior Publication Data
US 2007/0108096 A1    May 17, 2007

(51) Int. Cl.
*C10L 1/04* (2006.01)
(52) U.S. Cl. .......................... 208/15; 44/628; 48/198.1; 62/616; 62/46.2
(58) Field of Classification Search ............... 48/198.1; 585/943; 62/616, 46.2, 600, 607, 611, 926, 62/931; 208/15, 18, 19, 28, 950; 123/488, 123/527; 44/628; 527/3
See application file for complete search history.

(56) References Cited

U.S. PATENT DOCUMENTS

| | | | |
|---|---|---|---|
| 3,762,428 A | 10/1973 | Beck et al. | |
| 4,480,654 A | 11/1984 | Firey | |
| 4,520,763 A | 6/1985 | Lynch et al. | |
| 4,526,771 A | 7/1985 | Forbush et al. | |
| 4,559,133 A | 12/1985 | Siegfried et al. | |
| 4,608,830 A | 9/1986 | Peschka et al. | |
| 5,139,002 A | 8/1992 | Lynch et al. | |
| 5,183,011 A | 2/1993 | Fuji et al. | |
| 5,512,787 A | 4/1996 | Dederick | |
| 5,516,967 A | 5/1996 | Pandey et al. | |
| 5,529,484 A | 6/1996 | Moard et al. | |
| 5,558,783 A | 9/1996 | McGuiness | |
| 5,660,602 A | 8/1997 | Collier, Jr. et al. | |
| 5,666,923 A | 9/1997 | Collier, Jr. et al. | |
| 5,705,771 A | 1/1998 | Flynn et al. | |
| 5,771,857 A | 6/1998 | Willi | |
| 5,787,864 A | 8/1998 | Collier, Jr. et al. | |
| 5,804,760 A | 9/1998 | Flynn | |
| 5,826,632 A | 10/1998 | Micke et al. | |
| 5,868,133 A | 2/1999 | DeVries | |
| 5,887,567 A | 3/1999 | White et al. | |
| 6,058,713 A | 5/2000 | Bowen et al. | |

(Continued)

OTHER PUBLICATIONS

Basye, Leon et al., "Hydrogen Production Costs-A Survey", Dec. 4, 1997, pp. 1-10, Sentech, Inc., Bethesda, MD.

*Primary Examiner*—Glenn A Caldarola
*Assistant Examiner*—Pamela Weiss
(74) *Attorney, Agent, or Firm*—Stephen A. Gratton (57) ABSTRACT

A method for producing a supercritical cryogenic fuel (SCCF) includes dissolving a hydrogen gas in fuel value proportions into a supercritical hydrocarbon fluid. The method is performed by placing a hydrogen gas and a hydrocarbon fluid at a pressure greater than the critical pressure of the hydrocarbon, placing the hydrogen gas and the hydrocarbon fluid at a temperature below or approximately equal to the critical temperature of the hydrocarbon forming the supercritical hydrocarbon fluid, and then mixing to dissolve the hydrogen gas into the supercritical hydrocarbon fluid. A system for performing the method includes a vortex mixer configured to turbulently mix the hydrogen gas and the supercritical hydrocarbon fluid. The supercritical cryogenic fuel (SCCF) produced by the method and the system includes the supercritical hydrocarbon fluid with a selected mole fraction of the hydrogen gas dissolved therein.

25 Claims, 7 Drawing Sheets

U.S. PATENT DOCUMENTS

| | | |
|---|---|---|
| 6,105,631 A | 8/2000 | Pittroff et al. |
| 6,152,192 A | 11/2000 | Klotz et al. |
| 6,311,648 B1 | 11/2001 | Larocque |
| 6,739,125 B1 | 5/2004 | Mulligan |
| 6,745,613 B2 | 6/2004 | Rendahl et al. |
| 6,758,593 B1 | 7/2004 | Terentiev |
| 6,827,084 B2 | 12/2004 | Grubb, Jr. |
| 6,834,508 B2 | 12/2004 | Bradley |
| 6,901,952 B2 | 6/2005 | Girouard |
| 6,951,765 B1 | 10/2005 | Gopinath et al. |
| 7,168,464 B2 | 1/2007 | Diggins |
| 2003/0051486 A1 | 3/2003 | Ursan et al. |
| 2003/0177785 A1 | 9/2003 | Kimble et al. |
| 2004/0244280 A1 | 12/2004 | Waynick |
| 2005/0031918 A1 | 2/2005 | Barker et al. |
| 2006/0263283 A1 | 11/2006 | Egan et al. |
| 2007/0181083 A1 | 8/2007 | Fulton et al. |

| PROVIDE A METHANE FLUID |

| PROVIDE A HYDROGEN GAS |

| PLACE SELECTED MASS FLOW RATES OF THE METHANE FLUID AND THE HYDROGEN GAS AT A SELECTED PRESSURE ($P_s$) ABOVE THE CRITICAL PRESSURE OF METHANE |

| PLACE THE METHANE FLUID AND THE HYDROGEN GAS AT A SELECTED TEMPERATURE ($T_S$) BELOW OR APPROXIMATELY EQUAL TO THE CRITICAL TEMPERATURE AND ABOVE THE BOILING POINT OF METHANE FORMING A SUPERCRITICAL METHANE FLUID |

| TURBULENTLY MIX THE HYDROGEN GAS AND THE SUPER CRITICAL METHANE FLUID TO DISSOLVE THE HYDROGEN GAS INTO THE SUPERCRITICAL METHANE FLUID AND FORM A SUPERCRITICAL CRYOGENIC FUEL (SCCF) WITH A DESIRED COMPOSITION RATIO OF METHANE AND HYDROGEN |

| DELIVER THE SUPERCRITICAL CRYOGENIC FUEL (SCCF) TO A SUPERCRITICAL STORAGE TANK AND THEN ON DEMAND TO AN INTERNAL COMBUSTION ENGINE |

METHOD AND SYSTEM FOR PRODUCING A SUPERCRITICAL CRYOGENIC FUEL (SCCF)

FIELD OF THE INVENTION

This invention relates to alternative fuels and to methods and systems for forming and storing alternative fuels in supercritical storage tanks.

BACKGROUND OF THE INVENTION

Gaseous alternative fuels, such as hydrogen and natural gas, are valued for their clean burning characteristics in motor vehicle engines. However, the volume and weight of fuel storage tanks for gaseous alternative fuel are large, compared to petroleum or liquid alternative fuel storage tanks for equal vehicle driving range. One way to overcome this limitation is to refrigerate the gases until they become cryogenic liquids. High-density cryogenic storage tanks are called "dewars".

A particularly clean burning gaseous alternative fuel known as known as HYTHANE is formed from a mixture of hydrogen and natural gas. The prefix "Hy" in HYTHANE is taken from hydrogen. The suffix "thane" in HYTHANE is taken from methane, which is the primary constituent of natural gas. HYTHANE can be supplied to internal combustion engines from homogeneous compressed gas mixtures stored on board the vehicle in high-pressure fuel tanks. U.S. Pat. No. 5,139,002 to Frank E. Lynch and Roger W. Marmaro describes the production and use of HYTHANE in internal combustion engines. The '002 patent prescribes mixtures in the range of 10-30 percent hydrogen by volume in methane for various applications.

Unlike hydrogen and methane from which HYTHANE is made, HYTHANE cannot be made into a homogeneous liquid. As HYTHANE is cooled below the critical temperature of methane (−260° F.), methane will begin to condense, leaving gaseous residue increasingly rich in hydrogen. There is no significant solubility of hydrogen in liquid methane. However, if HYTHANE is maintained above the critical temperature of methane, the pressure of HYTHANE can be increased to any reasonable pressure with no concern for condensation. Compact containers for this cold high pressure gas are called "supercritical" storage tanks. Like dewars, these tanks are highly insulated. Unlike dewars, the inner vessel is rated for high pressures, (e.g., 1000 psig).

In view of the limitations of conventional alternative fuels and systems, it would be advantageous for an alternative fuel system to have new and different features that overcome some of these limitations. Aside from onboard fuel container issues, the method and equipment for preparing accurately blended HYTHANE and delivering it into the vehicle's onboard tanks at supercritical conditions are important. Cost and reliability of infrastructure are also critical to the success of any alternative fuel technology.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with methods and systems, which are meant to be exemplary and illustrative, not limiting in scope. In various embodiments, one or more of the above described limitations, have been reduced or eliminated, while other embodiments are directed to other improvements.

A method for producing a supercritical cryogenic fuel (SCCF) comprises dissolving hydrogen in fuel value proportions into a supercritical hydrocarbon fluid. Initially, selected mass flow rates of a hydrogen gas, and a hydrocarbon fluid, are placed at a pressure above the critical pressure of the hydrocarbon. The hydrogen gas and the hydrocarbon fluid are also placed at a temperature below or approximately equal to the critical temperature, but above the boiling point of the hydrocarbon, converting the hydrocarbon fluid to a supercritical hydrocarbon fluid. The hydrogen gas and the supercritical hydrocarbon fluid are then turbulently mixed together, dissolving the hydrogen gas into the supercritical hydrocarbon fluid. The resultant supercritical cryogenic fuel (SCCF) includes the supercritical hydrocarbon fluid containing dissolved hydrogen gas in a selected composition ratio. The method can be performed in a continuous process, and the supercritical cryogenic fuel (SCCF) can be pumped on demand into on board supercritical storage tanks for use in an internal combustion engine. In the illustrative embodiment, the hydrocarbon fluid comprises liquid or gaseous methane, and the supercritical cryogenic fuel (SCCF) comprises a supercritical HYTHANE fuel.

A system for producing the supercritical cryogenic fuel (SCCF) includes a first tank containing a hydrogen gas, a second tank containing a hydrocarbon fluid, and metering valves configured to meter selected mass flow rates from the tanks. The system also includes a super cooled expansion chamber configured to cool the hydrogen gas and the hydrocarbon fluid to a temperature above or approximately equal to the critical temperature of the hydrocarbon. The system also includes a compressor configured to compress the hydrogen gas and the hydrocarbon fluid to the pressure above the critical pressure of the hydrocarbon. The system also includes a vortex mixer in flow communication with the expansion chamber configured to turbulently mix the hydrogen gas and the supercritical hydrocarbon fluid, allowing the hydrogen gas to completely dissolve into the supercritical hydrocarbon fluid.

A refueling system is configured to fill an on board fuel storage tank of a vehicle fuel delivery system. The refueling system includes a fill nozzle which delivers the supercritical cryogenic fuel (SCCF) to an on board supercritical fuel storage tank, where it can be stored as a supercritical cryogenic fuel (SCCF). When the supercritical cryogenic fuel (SCCF) is supplied from the storage tank to a vehicle engine, it can be heated to room temperature, and the pressure reduced to a pressure required for combustion with a mixture of air.

An alternate embodiment refueling system is configured to supply liquid natural gas (LNG) from a tank at a low cryogenic temperature and pressure. The liquid natural gas (LNG) must be first compressed with a liquid pump to a pressure above the critical pressure, then heated, rather than cooled, to a temperature below or approximately equal to the critical temperature forming the supercritical hydrocarbon fluid. The refueling system also includes a vortex mixer in flow communication with an expansion chamber configured to turbulently mix a hydrogen gas and the supercritical hydrocarbon fluid, allowing the hydrogen gas to completely dissolve in the supercritical hydrocarbon fluid and forming the supercritical cryogenic fuel (SCCF). A fill nozzle in flow communication with an on board supercritical fuel storage tank of a vehicle fuel delivery system can now deliver the supercritical cryogenic fuel (SCCF) to the storage tank, where it can be stored as a supercritical cryogenic fuel (SCCF).

Another alternate embodiment on board refueling system stores liquid natural gas (LNG) and a hydrogen gas in separate tanks at cryogenic temperatures. A vortex mixer and metering system is used on a warmed gas mixture after the cold fluids have been heated to room temperature. In addition, a vehicle fuel system is configured to heat, reduce the pressure, and inject the fuel into the engine.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

DETAILED DESCRIPTION OF THE PREFERRED EMBODIMENTS

The following definitions are used in the present disclosure.

Critical temperature means the temperature above which a gas cannot be liquefied.

Critical pressure means the pressure at which a gas may just be liquefied at its critical temperature.

Supercritical fluid means a fluid at a pressure and temperature which are above the critical temperature and pressure of the fluid. In this state, there is no differentiation between the liquid and gas phases, and the fluid is referred to as a dense gas in which the saturated vapor and saturated liquid states are identical.

HYTHANE fuel means a gas which includes hydrogen and methane.

Supercritical cryogenic fuel (SCCF) means a fuel which includes hydrogen gas dissolved in a supercritical hydrocarbon fluid.

Turbulent mixing means a mixing of fluids having a Reynolds number greater than 10,000 and a viscosity ratio lower than 100 to 1, such that vortexes are created.

Room temperature means a temperature of from about 32° F. to 130° F. (0° C. to 54.4° C).

Fuel value quantity means in a quantity sufficient to provide a significant percentage of energy.

Figure 1:
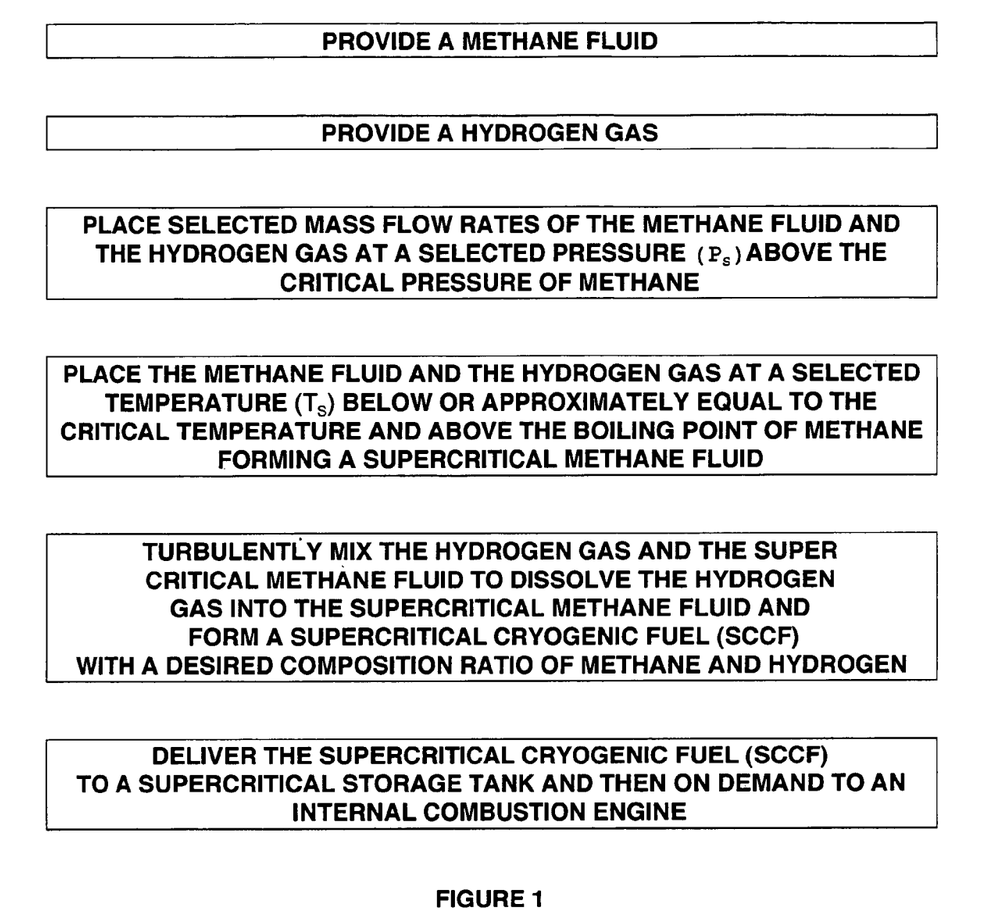
FIG. 1 is a flow chart illustrating broad steps in the method of the invention.

Referring to FIG. 1, broad steps in the method of the invention are illustrated. In the illustrative embodiment, the method of the invention is performed using the hydrocarbon methane. However, it is to be understood that the method can be performed with other hydrocarbons including ethylene, ethane, acetylene, propane, propylene, and propyne.

Figure 2:
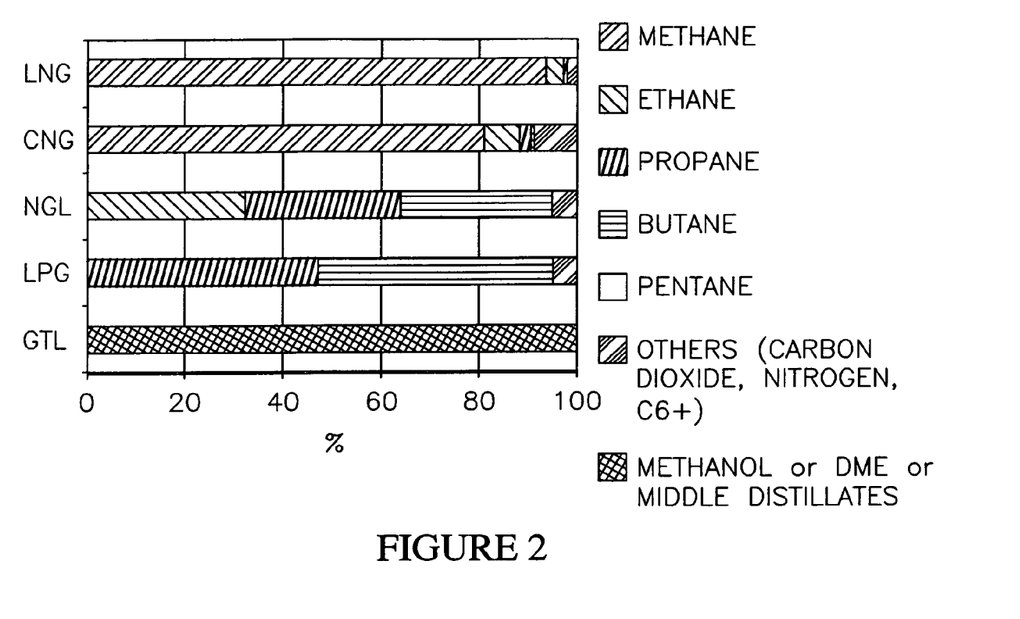
FIG. 2 is a chart illustrating typical composition of liquid natural gas (LNG), compressed natural gas (CNG), natural gas liquid (NGL), liquefied petroleum gas (LPG), and gas to liquid (GTL)

Initially, a methane fluid is provided. In the illustrative embodiment, the methane fluid comprises liquid natural gas (LNG) at about room temperature and a pressure of about 10 psig to 50 psig. In alternate embodiments to be described later, a methane fluid is provided at lower temperatures. As shown in FIG. 2, methane ($CH_4$) is the primary constituent (e.g., 95%) of liquid natural gas (LNG). Accordingly, in practicing the method of the invention, methane and liquid natural gas (LNG) can be used interchangeably. The methane fluid can initially be contained in a sealed vessel, such as a tank, at the desired temperature and pressure. In addition, the tank can include a metering valve, a mass flow controller, or other device, configured to transfer a desired mass flow rate of the methane fluid from the tank into sealed conduits in flow communication with the tank.

As also shown in FIG. 1, a hydrogen gas is provided. In the illustrative embodiment, the hydrogen gas is provided at about room temperature and a pressure of from about 885 psig to 1000 psig. The hydrogen gas can initially be contained in a sealed tank, or other vessel, at the desired temperature and pressure. In addition, the tank can include a metering valve, a mass flow controller, or other device, configured to transfer a desired mass flow rate of the hydrogen gas from the tank into sealed conduits in flow communication with the tank. The hydrogen gas can comprise any ratio of ortho/para concentration such as approximately 99.79% para hydrogen and 0.21% ortho hydrogen. In addition, any ratio of the isotropic forms of hydrogen, that is protium, deuterium, and tritium can be used in the practice of the invention.

Next, as shown in FIG. 1, a pressure placing step is performed in which the selected mass flow rates of the methane fluid and the hydrogen gas are placed at a selected pressure above the critical pressure of methane. In the illustrative embodiment, the pressure placing step is performed by compressing the methane fluid and the hydrogen gas to the selected pressure $P_M$. However, depending on the initial pressures, pressure regulators can also be used to reduce, rather than increase, the pressures to the selected pressure $P_M$. The selected pressure $P_S$ is a combination of the partial pressure $P_M$ of the methane fluid and the partial pressure $P_H$ of the hydrogen gas ($P_S = P_M + P_H$). As methane has a critical pressure of about 650 psia, and the hydrogen gas will exert a partial pressure of about 200 psia at the stated conditions, a representative range for the selected pressure ($P_S$) can be from about 900 psia to 1015 psia. In the illustrative embodiment the selected pressure is about 1000 psig.

The pressure placing step can be performed using a compressor in flow communication with the tanks 12, 14 containing the methane fluid and the hydrogen gas. The mass flow rates of the methane fluid and the hydrogen gas into the compressor can be selected to achieve a desired composition ratio of hydrogen and methane. In addition, the composition ratio is selected such that the resultant fuel includes hydrogen in a fuel value proportion. In the illustrative embodiment, the hydrogen gas has about a 2.1% mass fraction in the methane fluid, which is about a 16.8% mole fraction, and about a 5% energy fraction. A representative range for the mass fraction of the hydrogen gas in the methane fluid can be from about 2% to 3%. A representative range for the mole fraction of the hydrogen gas in the methane fluid can be from about 16% to 24%. A representative range for the energy fraction of the hydrogen gas in the methane fluid can be from about 5% to 7%. During the compressing step the methane fluid and the hydrogen gas combine to form a compressed mixture.

Next, as shown in FIG. 1, a temperature placing step is performed in which the methane fluid and the hydrogen gas are placed at a selected temperature ($T_S$), which is below or approximately equal to the critical temperature and above the boiling point of methane. In the illustrative embodiment, the temperature placing step can be performed by cooling using a supercooled expansion chamber which will be described later in the specification. However, depending on the initial temperature of the gases, the temperature placing step can also be performed by heating the gases. As methane has a critical temperature of about −116.6° F. (−46.53° C.), a representative range for the selected temperature ($T_S$) can be about −115° F. (46° C.) to −120° F. (−50° C.). As will be further explained, although the selected temperature ($T_S$) in theory must be below the critical temperature, in actual practice the method of the invention can be practiced with the selected temperature ($T_S$) approximately equal to the critical temperature (e.g., + or −5°).

Table 1 lists the properties of different compounds including methane used by the inventors in calculating the selected temperature ($T_S$) and the selected pressure ($P_S$).

selected pressure ($P_S$) may be needed to compensate for operational pressure oscillations near the critical point. In the illustrative embodiment, the selected temperature ($T_S$) is about −115° F. (−45.65° C.) which is approximately equal to methane's critical temperature of −116.5° F. (−46.53° C.).

Figure 4:
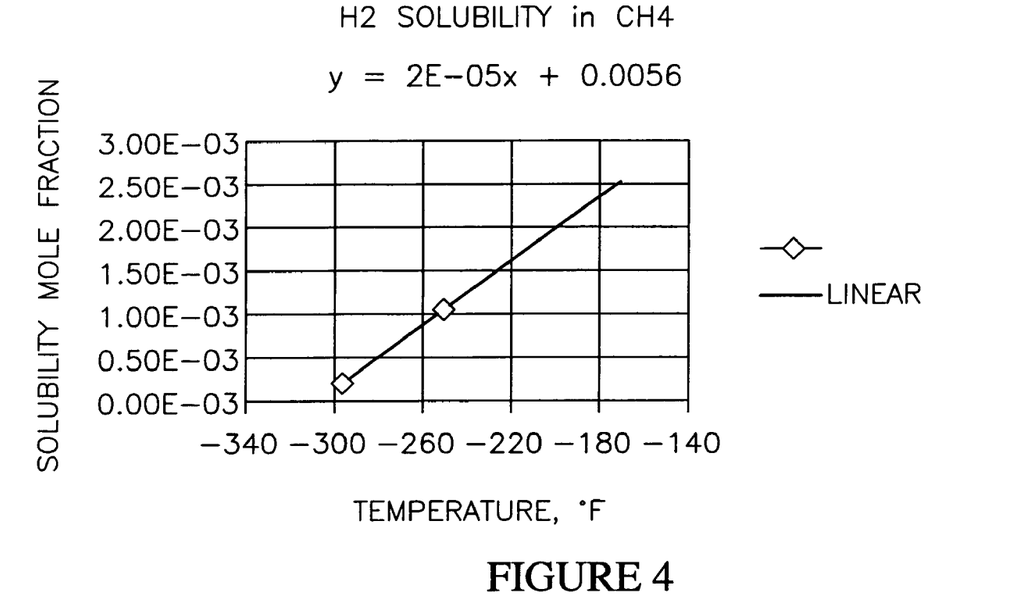
FIG. 4 is a chart illustrating hydrogen ($H_2$) solubility in methane ($CH_4$) as a function of temperature.
Figure 5:
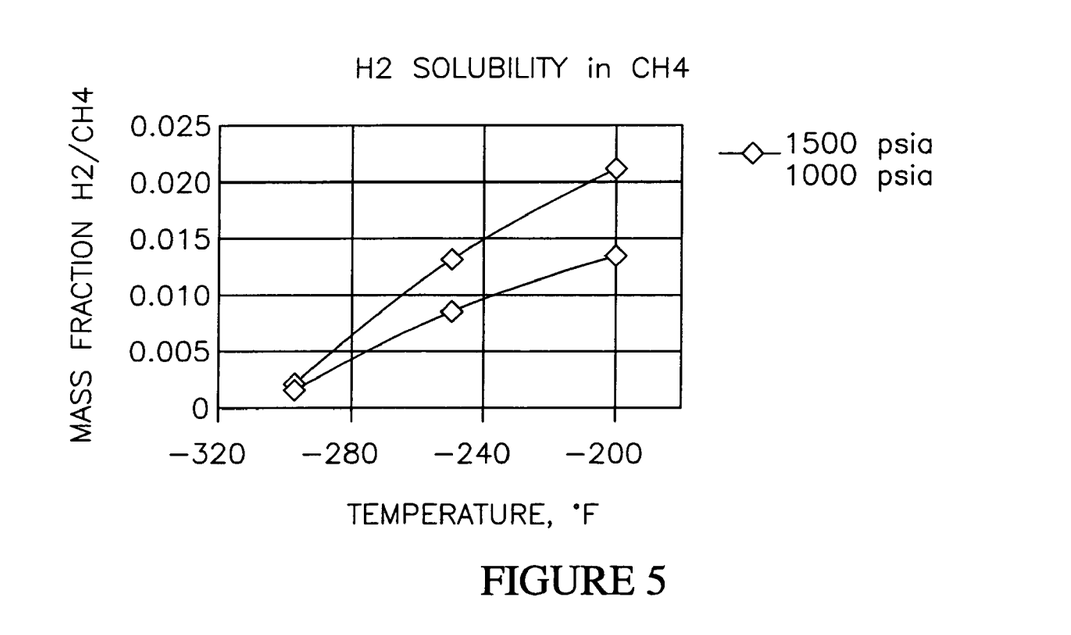
FIG. 5 is a chart illustrating hydrogen ($H_2$) solubility in methane ($CH_4$) as a function of pressure.

Next, as shown in FIG. 1, a turbulent mixing step is performed in which the hydrogen gas and the supercritical methane fluid are turbulently mixed together. The turbulent mixing dissolves the hydrogen gas into the supercritical methane fluid producing a supercritical cryogenic fuel (SCCF). The mixing step can be performed using a vortex mixer, which will be described later in the specification. In addition, FIGS. 3-5 illustrate different characteristics of HYTHANE, methane and hydrogen, which affect the mixing step, and the dissolving of the hydrogen gas into supercritical methane fluid.

Figure 3:
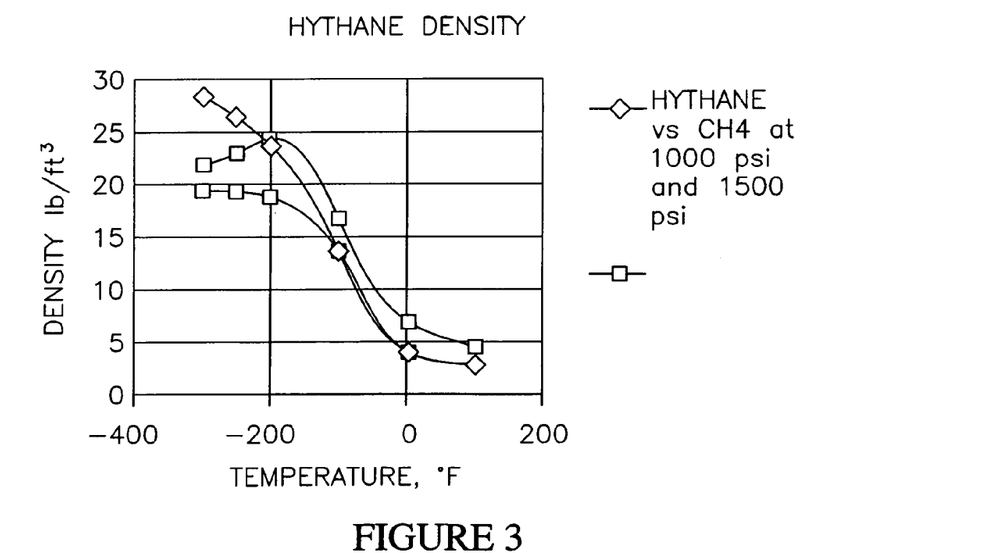
FIG. 3 is a chart illustrating HYTHANE density at two pressures and methane ($CH_4$) density at two pressures as a function of temperature.

In FIG. 3, the density of HYTHANE vs methane at 1000 psia and at 1500 psia is illustrated. In this example the HYTHANE has a composition ratio for hydrogen of about 16.8% mole fraction or 2.1% mass fraction or 5% energy fraction. Note that at 1000 psia all $H_2$ is in solution by −100° F. (−37.4° C). However, the two fluids are separate (partly in solution) at colder temperatures. In FIGS. 4 and 5, the solubility of hydrogen ($H_2$) in methane ($CH_4$) as a function of temperature (FIG. 4), and as a function of pressure (FIG. 5) are illustrated. Hydrogen is only slightly soluble in methane. At cold cryogenic temperatures (e.g., less than −258° F.), and high pressures (e.g., 1015 psia), it is difficult to achieve more

TABLE 1

| | Gas | | | | | |
|---|---|---|---|---|---|---|
| | He | $H_2$ | $CH_4$ | $N_2$ | $O_2$ | $F_2$ |
| Density at Normal Pressure and Temperature-NPT (lb/ft$^3$) | 0.0103 | 0.0052 | 0.0415 | 0.0724 | 0.0827 | 0.0982 |
| Boiling point at 1 atm (° F.) | −452.1 | −423.2 | −258.2 | −320.4 | −297.4 | −306.6 |
| Vapor density at Boiling point (lb/ft$^3$) | 1.06 | 0.084 | 0.111 | 0.288 | 0.296 | |
| Liquid density at Boiling point (lb/ft$^3$) | 7.62 | 4.37 | 26.46 | 50.41 | 71.27 | 94.2 |
| Heat of vaporization (Btm/lb) | 8.8 | 193 | 219.2 | 85.2 | 91.7 | 74.1 |
| Critical Temperature (° F.) | −450.3 | −400.3 | −116.5 | −232.8 | −181.1 | −200.2 |
| Critical Pressure (psia) | 33.2 | 187.7 | 673.1 | 492.3 | 736.9 | 808.3 |

In selecting the selected temperature ($T_S$), and also the selected pressure ($P_S$) other factors can be considered, such that these values may be either slightly above or below the theoretical critical temperature and pressure. As previously stated, the need to dissolve the hydrogen gas into the supercritical methane fluid requires that the temperature be above the normal boiling point of methane at one atmosphere, and below the critical temperature to maintain a maximum density of the hydrogen gas. However, these are not hard rules, and the selected temperature ($T_S$) can have an empirically derived value selected for dissolving all of the hydrogen gas into the supercritical methane fluid. In this regard, the selected temperature ($T_S$) will vary with the amount of hydrogen gas that needs to be dissolved, and also with the selected pressure ($P_S$) Similarly, some excess pressure over the than a 0.3% mass fraction of hydrogen in methane. The present invention recognizes that at soft cryogenic temperatures (e.g., liquid nitrogen temperatures of about −115° F.) hydrogen can be dissolved in methane at higher concentrations.

Next as shown in FIG. 1, a delivering step is performed in which the supercritical cryogenic fuel (SCCF) is delivered to a supercritical fuel storage tank and then on demand to an internal combustion engine. The delivery step can be performed using a delivery system which will be described later in the specification.

Figure 6:
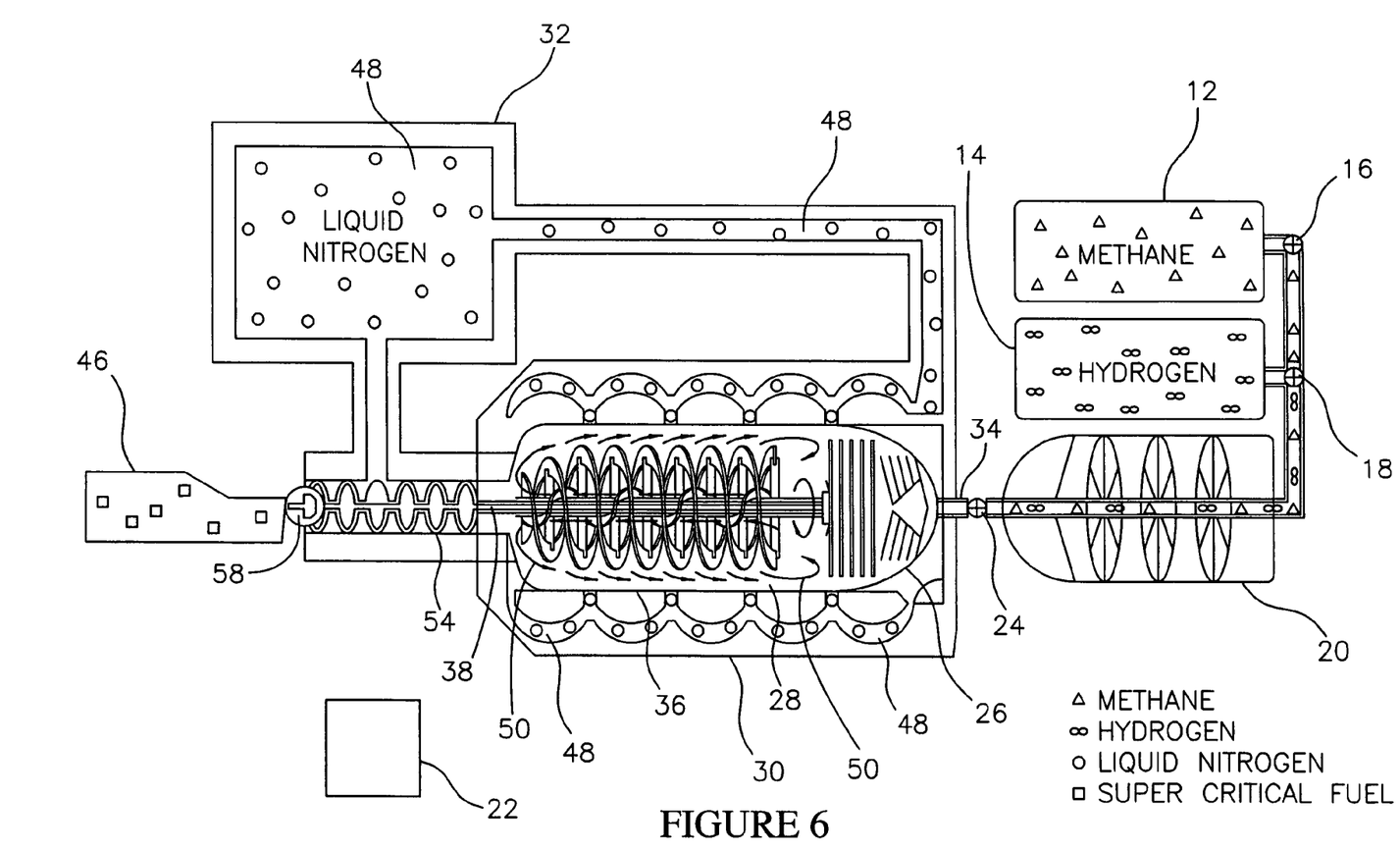
FIG. 6 is a schematic cross sectional drawing of a system for producing supercritical HYTHANE fuel in accordance with the invention.

Referring to FIG. 6, a system 10 constructed in accordance with the invention is illustrated. The system 10 includes a methane tank 12 containing a methane fluid, and a hydrogen tank 14 containing a hydrogen gas. The system 10 also includes a methane metering valve 16 configured to meter a selected mass flow rate of methane fluid from the methane tank 12, and a hydrogen metering valve 18 configured to meter a selected mass flow rate of hydrogen gas from the hydrogen tank 14. Preferably, the metering valves 16, 18 are solenoid controlled valves in signal communication with a controller 22 of the system 10. Metering valves and mass flow controllers are available from MKS Instruments, Andover Mass.; Porter Instruments, Hatfield, Pa.: Sierra Instruments, Carmel Valley, Calif.; and Unit Instruments, Orange, Calif.

The system 10 also includes a compressor 20 in flow communication with the metering valves 16, 18, which is configured to compress the methane fluid and the hydrogen gas to the selected pressure ($P_S$). The compressor 20 can be also be in signal communication with the controller 22. An outlet of the compressor 20 includes a flow control valve 24 in signal communication with the controller 22.

The system 10 also includes an expansion chamber 26 in flow communication with the compressor 20, a vortex mixer 28 in flow communication with the expansion chamber 26, and a coolant source 32 configured to circulate a liquid nitrogen coolant 48 around the expansion chamber 26 and around the vortex mixer 28.

As shown in FIG. 6, the expansion chamber 26 is in flow communication with a sealed conduit 34, which is in flow communication with the flow control valve 24 for the compressor 20. The expansion chamber 26 is configured to expand and cool the methane fluid and the hydrogen gas to the selected temperature ($T_S$). As previously explained, this converts the methane fluid to the supercritical methane fluid, which then flows along with the hydrogen gas into the vortex mixer 28. An inlet of the expansion chamber 26 has an inside diameter equal to that of the sealed conduit 34. An outlet of the expansion chamber 26 has an inside diameter equal to that of the vortex mixer 28. An outer surface of the expansion chamber 26 is in flow communication with the coolant source 32, such that liquid nitrogen circulates around and in contact with the outer surface of the expansion chamber 26. The compressed mixture entering the expansion chamber 26 is thus subjected to both conductive cooling from the chamber walls and convective cooling from the chamber interior.

Figure 7:
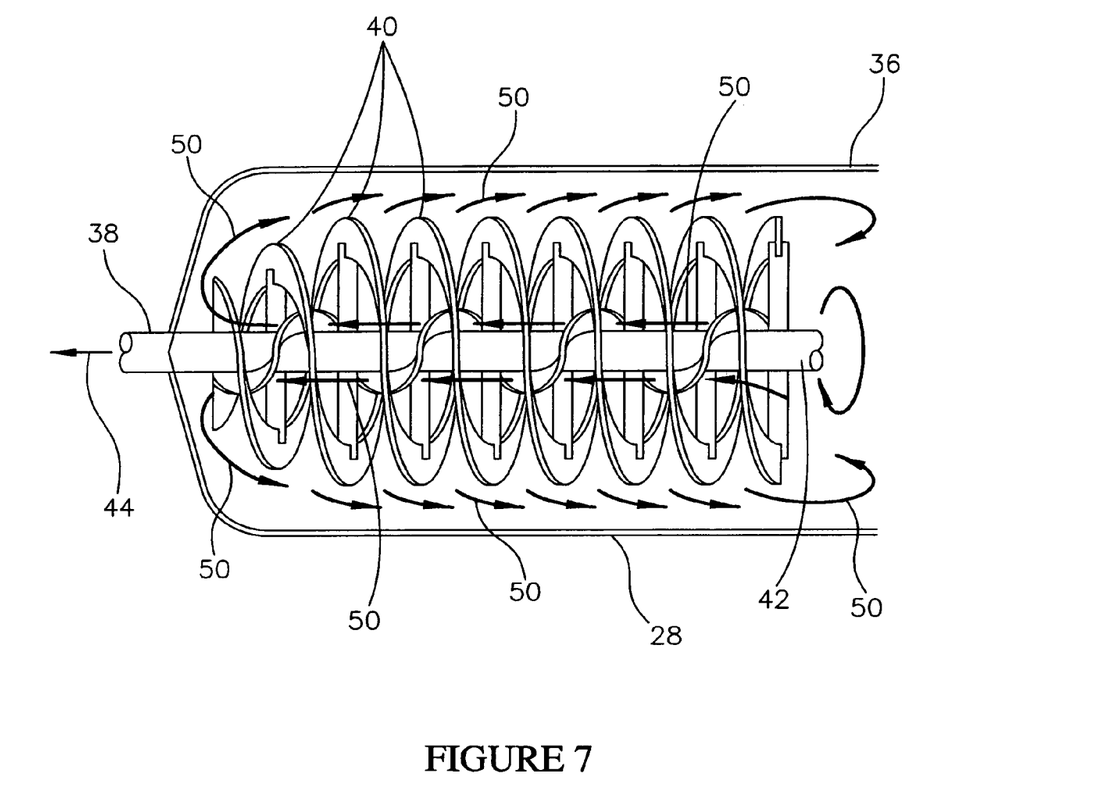
FIG. 7 is a enlarged schematic view of a vortex mixer of the system.

Referring to FIG. 7, the vortex mixer 28 is shown separately. The vortex mixer 28 comprises a generally cylindrically shaped, sealed vessel, configured to turbulently mix the hydrogen gas and the supercritical methane fluid, such that the hydrogen gas dissolves into the supercritical methane fluid and forms the supercritical cryogenic fuel (SCCF). In addition, the vortex mixer 28 is configured to maintain the supercritical methane fluid, the hydrogen gas and the mixed supercritical cryogenic fuel (SCCF) at the selected temperature ($T_S$) during the continuous turbulent mixing process. By way of example, the vortex mixer can have a diameter of from about 10 mm to 12 mm, and a length that is from about twice to several times it's diameter.

As shown in FIG. 7, the vortex mixer 28 includes an outer member 36 having outer walls configured to contact the liquid nitrogen coolant 48 circulated by the heat exchanger 30. The vortex mixer 28 also includes a central conduit 38 having an inlet 42 configured to collect the mixed supercritical cryogenic fuel (SCCF), and to transport the fuel as indicated by fuel flow arrow 44, to a vehicle delivery system 46 of the system 10.

As also shown in FIG. 7, the vortex mixer 28 also includes a plurality of baffle plates 40 configured to form turbulent fluid flow through the vortex mixer 28, as indicated by turbulent flow arrows 50. The baffle plates 40 can be mounted to the central conduit 38 of the vortex mixer 28 in a spiral configuration, substantially as shown in FIGS. 6 and 7. Alternately, the baffle plates 40 can be mounted to the inner walls of the outer member 36 in an angled configuration (not shown). In either case, the main function of the baffle plates 40 is to create turbulent vortexes for mixing the hydrogen gas into the supercritical methane fluid. As shown in FIG. 7, the turbulent flow arrows 50 can extend through and around the baffle plates 40, and along the longitudinal axis of the central conduit 38. Because of the efficiency of the vortex mixer 28, mixing occurs within seconds or fractions of seconds. In addition, because of the turbulent flow produced by the vortex mixer 28, and the temperature and pressure of the hydrogen gas and supercritical methane fluid, substantially all of the hydrogen gas can be dissolved into the supercritical methane fluid. Advantageously, the hydrogen gas can be contained in the resultant supercritical cryogenic fuel (SCCF) in fuel value proportions.

As shown in FIG. 6, the heat exchanger 30 includes internal conduits 52 configured to circulate the liquid nitrogen coolant 48 around the expansion chamber 26, and around the vortex mixer 28. The heat exchanger 30 also includes internal conduits 54 configured to circulate the liquid nitrogen coolant 48 around a sealed conduit 56 in flow communication with the central conduit 38 of the vortex mixer 28. The conduit 56 also includes a flow control valve 58 in signal communication with the controller 22, configured to control fluid flow of the supercritical cryogenic fuel (SCCF) into the vehicle delivery system 46. Further details of the fuel delivery system 46 will be described as the description proceeds.

The system 10 (FIG. 6) is particularly suited for use with alternative fueled vehicles (AFVs). Production and delivery of the supercritical cryogenic fuel (SCCF) can be accomplished by different implementations of the system and the method. Table 2 lists potential locations of the system 10 (FIG. 6) for alternative fueled vehicles (ATVs) and the relative costs.

TABLE 2

Classification of System 10 (FIG. 6)

| System Location | SC or Supercritical Storage Tank | Relative Cost |
|---|---|---|
| Fueling Station | SC | Cheap |
| Vehicle Tank | SC | Moderate |
| Engine | SC + H2 Tank | Expensive |

In alternative fueled vehicles (ATVs) the mixing requirements drive the design of each system. A primary consideration is that the hydrogen must be well mixed and dissolved into the supercritical methane fluid. Based on limited solubility data, this can be achieved by keeping the temperature above about (−120° F.) and the pressure above about 1300 psia for a fuel with about 2% or more hydrogen gas by mass mixed/dissolved in the supercritical methane fluid. As the critical pressure of liquid natural gas (LNG) is about 650 psia and the critical temperature is about (−115° F.) (−46° C.), the methane will be in a supercritical state.

Figure 8:
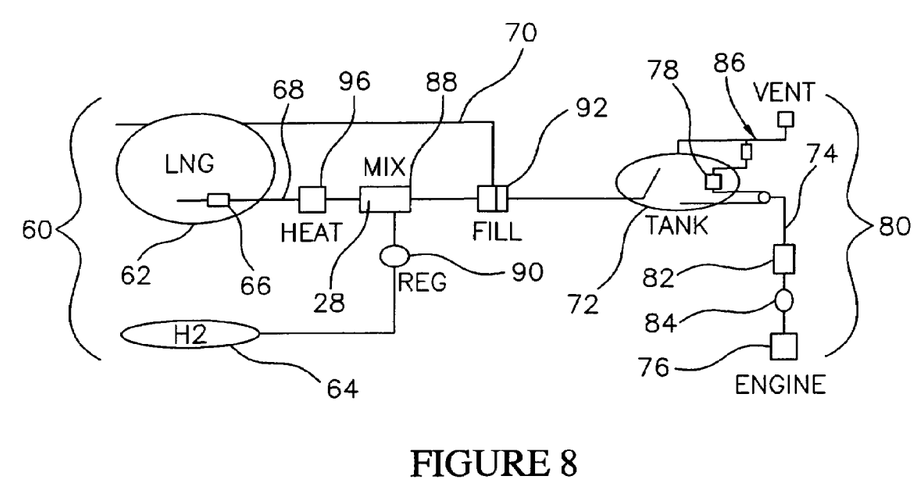
FIG. 8 is a schematic drawing of a fueling station incorporating a system constructed in accordance with the invention.

Three exemplary implementations of the method are as follows:

1. a) compress liquid natural gas (LNG)
   b) mix liquid natural gas (LNG) with high pressure hydrogen gas (GH2)
   c) deliver supercritical cryogenic fluid (SCCF)
2. a) mix hydrogen gas (GH2) and gaseous natural gas (GNG)

b) liquefy and scrub contaminants from gaseous natural gas (GNG)
c) compress mixture
d) deliver supercritical cryogenic fluid (SCCF)
3. a) deliver liquid natural gas (LNG) in supercritical or subcritical state and hydrogen gas (GH2) as a cold cryogenic gas
b) mix warm on board vehicle after heating Refueling System Referring to FIG. 8, a refueling system 60 for alternative fueled vehicle (AFV) incorporating elements of the system 10 (FIG. 6) is shown. The refueling system 60 includes an insulated LNG storage tank 62 at low pressure (e.g., less than 50 psig) containing a large quantity of liquid natural gas (LNG) at a temperature of about –237° F. (–394.6° C.). The LNG storage tank 62 is substantially equivalent to the methane tank 12 (FIG. 6) in the system 10 (FIG. 6). A high pressure liquid pump 66 is submerged in the LNG storage tank 62, and is configured to compress the liquid natural gas (LNG) to a pressure of about 1000 psig. The cold liquid natural gas (LNG) is first used to chill supply conduits 68, and is then recirculated through a recirculating conduit 70 back to the LNG storage tank 62.

The refueling system 60 also includes a hydrogen storage tank 64 containing hydrogen gas at a relatively high pressure (e.g., 3000 psig) and a temperature of about 70° F. (21.1° C.). The hydrogen storage tank 64 is in flow communication with a pressure regulator 90 configured to reduce the pressure of the hydrogen gas to a selected pressure ($P_S$) of about 1000 psig. The hydrogen storage tank 64 is substantially equivalent to the hydrogen tank 14 in FIG. 6.

The refueling system 60 also includes a heater 96 configured to heat the liquid natural gas to the selected temperature ($T_S$). The refueling system 60 also includes a mixing station 88 which includes the vortex mixer 28 (FIG. 6) constructed substantially as previously described. In addition, the refueling system 60 includes a fill nozzle 92 configured to interface with a fill conduit 94 on the vehicle.

An on board fuel delivery system 80 on the vehicle includes a supercritical storage tank 72, a heater in the supercritical storage tank 72, a supply conduit 74 in flow communication with the supercritical storage tank 72, and a vehicle engine 76. The supply conduit 74 also includes an HX component 82 configured to heat the fuel to room temperature, and a pressure regulator 84. The fuel delivery system 80 also includes a pressure control system 86 configured to reduce the pressure in the supercritical storage tank 72, so that the tank can be filled with the supercritical fuel discharged from the mixing station 88.

Initially, the cold liquid natural gas LNG is pumped by the liquid pump 66 from the LNG storage tank 62 through the heater 96, and is heated by the heater 96 to a temperature of about –115° F. (–46° C.). At the mixing station 88, the liquid natural gas (LNG) is mixed with hydrogen gas from the hydrogen storage tank 64 in the required proportions, and then continues through the fill nozzle 92 to fill the supercritical storage tank 72. When the supercritical storage tank 72 is full, as determined by pressure and quantity gages, the fill stops. The supercritical storage tank 72 will now maintain the pressure using heat from the heater 78 to raise pressure, and venting from the pressure control system 86 as needed to reduce pressure through a clean burn system (not shown). The supercritical storage tank 72 cannot be locked up for 3 days to prevent venting, so the pressure control system 86 makes sure that all vent gasses are safe to vent in all situations. When the vehicle engine 76 is ready to operate, the fuel is warmed to room temperature by the heater 78 as it flows to the engine 76, and the pressure regulator 84 reduces the pressure to that needed by the engine 76.

Figure 9:
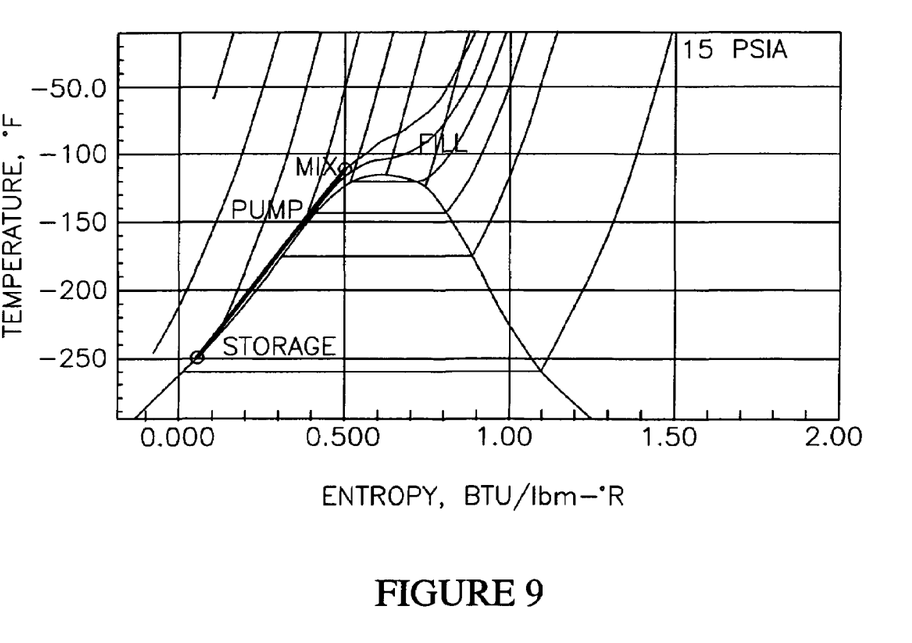
FIG. 9 is a chart illustrating methane operation sequences (pump/heat combined) for the fueling station of FIG. 7.

The on board fuel delivery system 80 (FIG. 8) is an on-demand system. FIG. 9 is a chart illustrating entropy in the refueling system 60 and the fuel delivery system 80 (FIG. 8) as a function of temperature. The general characteristics of fuel delivery system 80 with pressures, temperatures, flows, and other requirements are contained in Table 3 below.

TABLE 3

| Characteristics of refueling system 60 and fuel delivery system 80 | |
|---|---|
| 1 - Storage Tank - LNG | |
| Pressure | 20.3 psig |
| Temperature | –237.61 F. |
| 2 - Pump - LIQUID - constant T | |
| Exit Pressure | 1000 psig |
| Exit Temperature | –233.69 F. |
| Flow | 10 gpm |
| Horsepower | 6,738.134 Watts |
| 3 - Heater | |
| Exit Pressure | 1000 psig |
| Exit Temperature | –115 F. |
| Heat added | 76,695.07 Watts |
| 4 - GH2 | |
| Mass Ratio | 2.1 % |
| Flow | 0.717207 lbm/min |
| 5 - Heat Exchanger on vehicle | |
| Flow | 1 gpm |
| Pressure | 1300 psig |
| Temperature | 20 F. |
| Heat transfer | 14,2693.4 Watts |

On Board Fuel System

Figure 10:
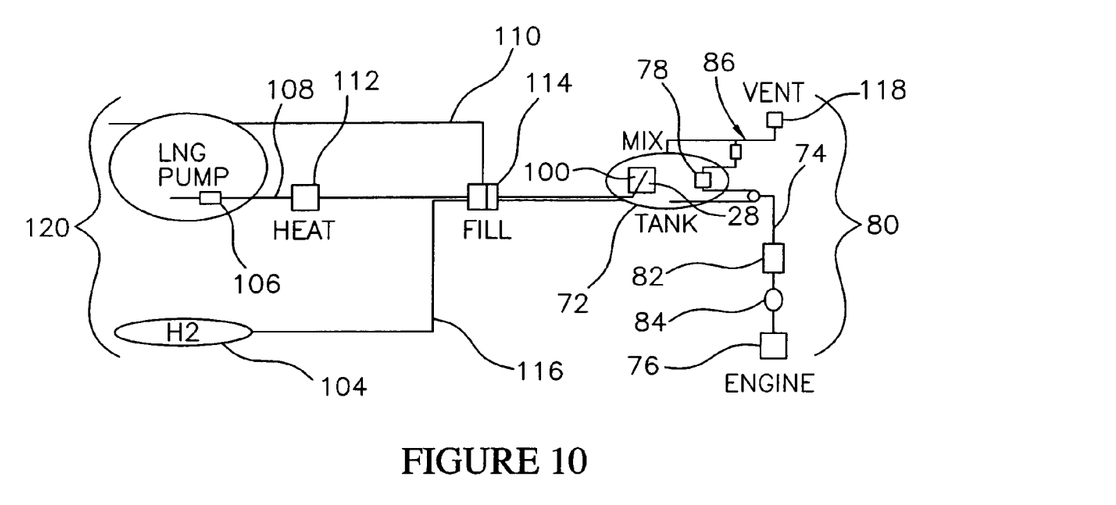
FIG. 10 is a schematic drawing of a vehicle fuel tank incorporating a system constructed in accordance with the invention.

Referring to FIG. 10, an on board fuel system 98 for an alternative fueled vehicle (AFV) incorporating a mixing station 100 in the on board supercritical storage tank 72 is illustrated. A refueling system 120 associated with the on board fuel system 98 includes an insulated liquid natural gas (LNG) storage tank 102 containing liquid natural gas (LNG) at a relatively low pressures (e.g., less than 50 psig) and cold cryogenic temperature (e.g., –237° F.). The refueling system 120 also includes a hydrogen storage tank 104 containing hydrogen gas at a relatively high pressure (e.g., about 3000 psig) and a temperature of about 70° F. (21.1° C.). A supply conduit 108 of the liquid natural gas (LNG) storage tank 102 is in flow communication with a heater 112 and a fill nozzle 114. A supply conduit 116 of the hydrogen storage tank 104 is also in flow communication with the fill nozzle 114.

A high pressure liquid pump 106 is submerged in the storage tank 102 for pressurizing the liquid natural gas (LNG) at a temperature of –237° F. to a selected pressure ($P_S$) at the mixing station 100 of about 1000 psig. The cold liquid natural gas (LNG) is first used to chill the supply conduit 108, and is then recirculated through a recirculating conduit 110 back to the liquid natural gas (LNG) storage tank 102. The pressure in the supercritical storage tank 72 is reduced by venting so that the supercritical storage tank 72 can be filled with liquid natural gas (LNG) and the hydrogen gas. The liquid natural gas (LNG) is heated by the heater 112 to about (–180° F.) at the refueling station, and is then pumped into the supercritical storage tank 72 to the proper level. The hydrogen gas is then is pumped into the supercritical storage tank 72, until the supercritical storage tank 72 has the correct amount of liquid natural gas (LNG) and hydrogen gas.

In the supercritical storage tank 72, the liquid natural gas (LNG) is first used to operate the engine 76 without being thoroughly mixed with hydrogen gas, while the heater 78 (e.g., a 50 watt heater) heats the liquid natural gas (LNG) to about (−130° F.) and then mixes it with hydrogen gas in the desired proportions. It is possible to lockup the supercritical storage tank 72 without venting as long as the pressure is well below the set point of a relief valve 118 of the pressure control system 86. Once fully mixed the pressure will be maintained using heat from the pressure control system 86, and using venting as needed to reduce pressure through the clean burn system (not shown).

Once the set-point of the relief valve 118 is reached, the supercritical storage tank 72 cannot be locked up to prevent venting, and the clean burn venting system makes sure that all vent gasses are safe to vent in all situations. When the engine 76 is ready to operate the fuel is warmed by the heater 78 to room temperature, as it flows to the engine 76 and the pressure regulator reduces 84 the pressure to that needed by the engine 76. The on board fuel system 80 is an on-demand system.

Figure 11:
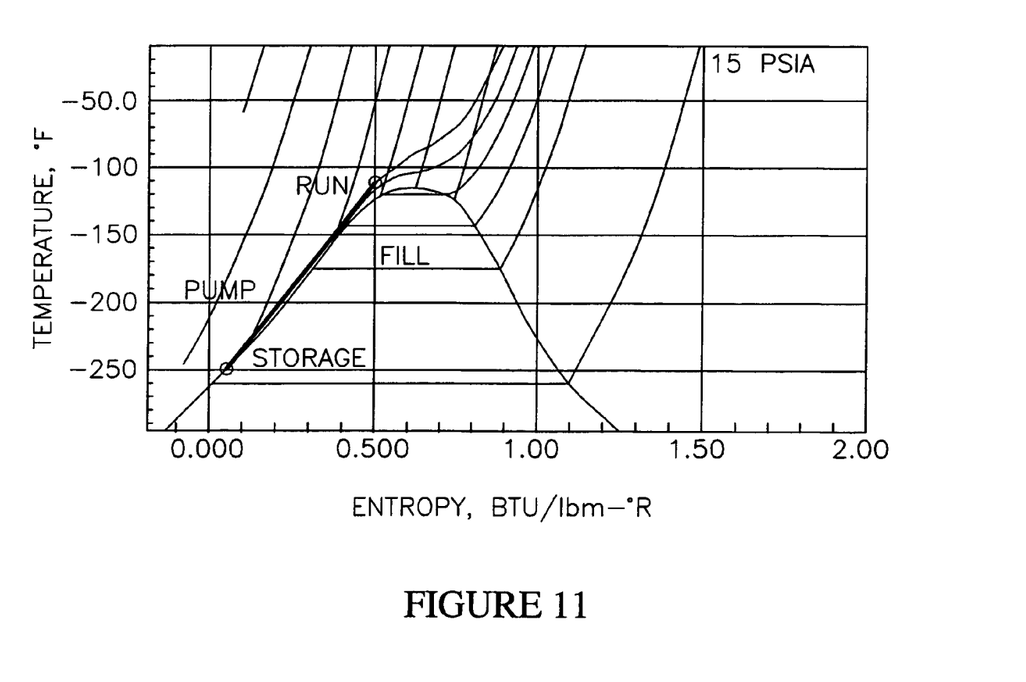
FIG. 11 is a chart illustrating methane tank fill sequence with pump/heat combined (heat/pressurize/mix after fill) for the tank of FIG. 9.

FIG. 11 is a chart illustrating entropy in the refueling system 120 and the fuel delivery system 80 (FIG. 8) as a function of temperature. The general characteristics of the refueling system 120 and the on board fuel system 98 with pressures, temperatures, flows, and other requirements are contained in Table 4 below.

TABLE 4

Characteristics of refueling system 120 and on board fuel system 80

1 - Storage Tank - LNG

| | | |
|---|---|---|
| Pressure | 20.3 | Psig |
| Temperature | −237.61 | F. |

2 - Pump - LIQUID - constant T

| | | |
|---|---|---|
| Exit Pressure | 600 | psig |
| Exit Temperature | −233.69 | F. |
| Flow | 10 | gpm |
| Horsepower | 3,438.134 | Watts |

3 - Heater

| | | |
|---|---|---|
| Exit Pressure | 600 | psig |
| Exit Temperature | −180 | F. |
| Heat added | 46,695.07 | Watts |

4 - GH2

| | | |
|---|---|---|
| Mass Ratio | 2.1 | % |
| Flow | 0.717207 | lbm/min |

9 - Heat Exchanger on vehicle

| | | |
|---|---|---|
| Flow | 1 | gpm |
| Pressure | 1000 | psig |
| Temperature | 20 | F. |
| Heat transfer | 14,2693.4 | Watts |

Thus the invention provides an improved method and system for producing a supercritical cryogenic fuel (SCCF) and an improved supercritical cryogenic fuel (SCCF). While the invention has been described with reference to certain preferred embodiments, as will be apparent to those skilled in the art, certain changes and modifications can be made without departing from the scope of the invention as defined by the following claims.

What is claimed is:

1. A method for producing a fuel comprising:
providing a hydrogen gas and a supercritical hydrocarbon fluid comprising a hydrocarbon in a selected composition ratio, at a pressure above a critical pressure of the hydrocarbon, and at a temperature below or approximately equal to a critical temperature of the hydrocarbon; and
turbulently mixing the hydrogen gas and the supercritical hydrocarbon fluid to dissolve the hydrogen gas into the supercritical hydrocarbon fluid.

2. The method of claim 1 wherein the selected composition ratio comprises from about 2% to 3% mass fraction of the hydrogen gas in the supercritical hydrocarbon fluid.

3. The method of claim 1 wherein the selected composition ratio comprises from about 16% to 24% mole fraction of the hydrogen gas in the supercritical hydrocarbon fluid.

4. The method of claim 1 wherein the selected composition ratio comprises from about 5% to 7% mole energy fraction of the hydrogen gas in the supercritical hydrocarbon fluid.

5. The method of claim 1 wherein the pressure is from about 900 psia to 1015 psia.

6. The method of claim 1 wherein the temperature is from about −115° F. (−46° C.) to −120° F. (−50° C.).

7. The method of claim 1 wherein the pressure is about 1000 psia and the temperature is about −115° F. (−46° C.).

8. The method of claim 1 wherein the hydrocarbon comprises methane and the supercritical hydrocarbon fluid comprises liquid natural gas (LNG).

9. The method of claim 1 further comprising following the mixing step delivering the fuel to a supercritical storage tank and then to an internal combustion engine.

10. A method for producing a fuel comprising:
providing a hydrogen gas comprising hydrogen;
providing a hydrocarbon fluid comprising a hydrocarbon;
placing selected mass flow rates of the hydrogen gas and the hydrocarbon fluid at a pressure above a critical pressure of the hydrocarbon;
converting the hydrocarbon fluid to a supercritical hydrocarbon fluid by placing the hydrocarbon fluid at a temperature below or approximately equal to a critical temperature of the hydrocarbon and above a boiling temperature of the hydrocarbon; and
mixing the hydrogen gas and the supercritical hydrocarbon fluid to dissolve the hydrogen gas into the supercritical hydrocarbon fluid.

11. The method of claim 10 wherein the hydrocarbon comprises a compound selected from the group consisting of methane, ethylene, ethane, acetylene, propane, propylene, and propyne.

12. The method of claim 10 wherein the hydrocarbon fluid comprises liquid natural gas (LNG) and the hydrocarbon comprises methane.

13. The method of claim 10 wherein the mixing step comprises turbulent mixing.

14. The method of claim 10 further comprising following the mixing step delivering the supercritical hydrocarbon fluid with the hydrogen gas dissolved therein to a supercritical storage tank.

15. The method of claim 10 wherein the converting step is performed using liquid nitrogen.

16. The method of claim 10 wherein the pressure is from about 900 psia to 1015 psia.

17. The method of claim 10 wherein the temperature is from about −115° F. (−46° C.) to −120° F. (−50° C.).

18. The method of claim 10 wherein the pressure is about 1000 psia and the temperature is about −115° F. (−46° C.).

19. A method for producing a fuel comprising:
providing a hydrogen gas comprising hydrogen;
providing a methane fluid comprising methane;
placing a mixture of the hydrogen gas and the methane fluid having a composition ratio of from about 2% to 3% mass fraction of the hydrogen gas in the methane fluid at a pressure of from about 900 psia to 1015 psia;

placing the mixture at a temperature of about −115° F. (−46° C.) to −120° F. (−50° C.) such that the methane fluid forms a supercritical methane fluid; and mixing the hydrogen gas and the supercritical methane fluid to dissolve the hydrogen gas into the supercritical methane fluid.

20. The method of claim 19 wherein the mixing step is performed using a vortex mixer configured to perform turbulent mixing.

21. The method of claim 19 wherein the providing the hydrogen gas step comprises providing the hydrogen gas at about room temperature.

22. The method of claim 19 wherein the providing the methane fluid step comprises providing the methane fluid at a first temperature of about −237° F. (−394.6° C.).

23. The method of claim 19 further comprising delivering the fuel to a supercritical storage tank and then to an internal combustion engine.

24. The method of claim 19 wherein the mixing step is performed in a refueling system for an alternative fueled vehicle (ATV).

25. The method of claim 19 wherein the mixing step is performed in a supercritical storage tank of an alternative fueled vehicle (ATV).

* * * * *